(12) United States Patent
Kawachi (10) Patent No.: US 12,358,323 B2
(45) Date of Patent: Jul. 15, 2025

(54) TIRE

(71) Applicant: SUMITOMO RUBBER INDUSTRIES, LTD., Kobe (JP)

(72) Inventor: Takahiro Kawachi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/973,624

(22) Filed: Oct. 26, 2022

(65) Prior Publication Data

US 2023/0173842 A1  Jun. 8, 2023

(30) Foreign Application Priority Data

Nov. 26, 2021 (JP) ................................. 2021-192319
Sep. 27, 2022 (JP) ................................. 2022-153888

(51) Int. Cl.
| | |
|---|---|
| *B60C 11/00* | (2006.01) |
| *B60C 1/00* | (2006.01) |
| *B60C 11/03* | (2006.01) |
| *B60C 11/12* | (2006.01) |

(52) U.S. Cl.
CPC .......... *B60C 1/0016* (2013.01); *B60C 11/032* (2013.01); *B60C 2011/0025* (2013.01); *B60C 2011/0033* (2013.01); *B60C 2011/0367* (2013.01); *B60C 2011/0381* (2013.01)

(58) Field of Classification Search
CPC ................ B60C 1/0016; B60C 11/032; B60C 2011/0033; B60C 2011/0367; B60C 2011/0025; B60C 2011/0381
See application file for complete search history.

(56) References Cited

U.S. PATENT DOCUMENTS

| | | | | |
|---|---|---|---|---|
| 5,370,167 A | * | 12/1994 | Kogure | ..................... B60C 9/18 |
| | | | | 152/537 |
| 2011/0259498 A1 | * | 10/2011 | Pagano | ................. B60C 19/002 |
| | | | | 152/450 |
| 2015/0191052 A1 | | 7/2015 | Okabe et al. | |

(Continued)

FOREIGN PATENT DOCUMENTS

| | | | |
|---|---|---|---|
| EP | 588781 A1 | * | 3/1994 |
| EP | 3 401 121 A1 | | 11/2018 |

(Continued)

OTHER PUBLICATIONS

Machine translation for Europe 588781 (Year: 2023).*
Machine translation for Japan 08-091023 (Year: 2023).*

*Primary Examiner* — Steven D Maki
(74) *Attorney, Agent, or Firm* — Birch, Stewart, Kolasch & Birch, LLP (57) ABSTRACT

It is an object to provide a tire having an excellent balance of wet grip performance and chipping resistance. The tire is a tire comprising a tread, wherein the tread has a lateral groove neither of both ends of which opens into circumferential grooves, wherein a predetermined rubber component, a predetermined filler, and a silane coupling agent are compounded in a rubber layer of a tread surface, wherein a brittleness temperature of the rubber component and a ratio of a groove depth at the deepest part of the groove bottom of the lateral groove neither of both ends of which opens into the circumferential grooves to a thickness of the entire tread are made to lie in predetermined ranges.

12 Claims, 1 Drawing Sheet

(56) References Cited

U.S. PATENT DOCUMENTS

2016/0303918 A1\* 10/2016 Hayashi ................ B60C 11/032
2019/0023879 A1\* 1/2019 Miyazaki ................ B60C 1/00
2019/0030954 A1\* 1/2019 Nakatani ............ B60C 11/0041
2019/0390042 A1\* 12/2019 Kunisawa ................ C08L 9/06
2020/0040168 A1\* 2/2020 Watanabe ............... C08L 91/06

FOREIGN PATENT DOCUMENTS

| EP | 3738998 A1 | \* | 11/2020 |
| JP | 08-091023 A | \* | 4/1996 |
| JP | 5957474 B2 | | 7/2016 |
| JP | 2018-188567 A | | 11/2018 |

\* cited by examiner

TIRE

TECHNICAL FIELD

The present disclosure relates to a tire.

BACKGROUND OF THE INVENTION

In the North American market, 4WD vehicles are major vehicles. Users in the North American tend to think that the 4WD vehicles can run also in the case of extraordinarily heavy snowfall if the users drive the 4WD vehicles, and the 4WD vehicles run with the same tires at a high speed even on extraordinarily heavy snowfall areas, irregular grounds, and wet road surfaces due to thaw. Accordingly, chipping resistance together with wet grip performance has been also needed for SUV tires mainly for the North American market.

For example, JP 5957474 B discloses a heavy-duty pneumatic tire having a plurality of circumferential main grooves and lateral grooves in a tread part and having improved chipping resistance.

Moreover, JP 2018-188567 A discloses a tire tread composed of a rubber composition that comprises a reformed natural rubber and a styrene-butadiene rubber and that has an excellent chipping resistance.

SUMMARY OF THE INVENTION

When a vehicle with tires each having a lateral groove neither of both ends of which opens into a circumferential groove and whose groove depth is deep moves on an irregular ground, a stone or the like is caught in the lateral groove and becomes hard to be removed, and heat is generated therefrom, thereby causing chip cutting and block chipping to easily occur in a tread rubber. Therefore, when the tires have such a tread pattern as described above, it becomes necessary to use, for a tread part, a rubber composition having a more excellent chipping resistance than usual.

Moreover, when a natural rubber and a styrene-butadiene rubber having rigidity higher than that of the natural rubber are mixed, phases different in hardness coexist microspically, so that it becomes hard for impact and a crack to propagate and it becomes hard for chip cutting and block chipping to occur at normal temperature. However, when tan δ becomes increased by using two components in combination, a brittleness temperature increases, and it becomes easy for chip cutting and block chipping of a tread rubber to occur at a low temperature.

It is an object of the present disclosure to provide a tire having an excellent balance of wet grip performance and chipping resistance at a low temperature.

As a result of intensive studies, it has been found that the above-described problem can be solved by, in a tire comprising a tread having a lateral groove neither of both ends of which opens into a circumferential groove, compounding a predetermined rubber component, a predetermined filler, and a predetermined silane coupling agent with a rubber layer of a tread surface and by setting a brittleness temperature of the rubber layer and a ratio of a groove depth at the deepest part of the groove bottom of the lateral groove neither of both ends of which opens into the circumferential grooves to a thickness of the entire tread within predetermined ranges.

That is, the present disclosure relates to:
a tire comprising a tread,
wherein the tread has land parts partitioned by a plurality of circumferential grooves,
wherein at least one of the land parts has a lateral groove neither of both ends of which opens into the circumferential grooves,
wherein the tread has at least one rubber layer,
wherein, among the at least one rubber layer, a rubber layer of a tread surface is composed of a rubber composition comprising a rubber component, a filler, and a silane coupling agent,
wherein the rubber component of the rubber layer of the tread surface comprises an isoprene-based rubber and a styrene-butadiene rubber,
wherein the filler comprises silica whose average primary particle size is 18 nm or less,
wherein, when a brittleness temperature of the rubber composition is defined as A (° C.) and a ratio of a groove depth at the deepest part of the groove bottom of the lateral groove neither of both ends of which opens into the circumferential grooves to a thickness of the entire tread is defined as B, A is −40 or less, B is 0.80 or more, and A/B is −75 to −50.

According to the present disclosure, a tire having an excellent balance of wet grip performance and chipping resistance at a low temperature is provided.

DETAILED DESCRIPTION

As a mechanism enabling well-balanced improvement in wet grip performance and chipping resistance in the present disclosure, the following is considered, although it is not intended to be bound by any theory.

The tire according to the present disclosure has features that (1) drainage performance on wet road surfaces is improved by providing a lateral groove neither of both ends of which opens into the circumferential grooves and whose groove depth is deep, (2) tan δ becomes increased by using two rubber components of an isoprene-based rubber and a styrene-butadiene rubber for a tread, and wet grip performance and chipping resistance are improved by dissipating energy caused by heat generation or the like, (3) rigidity of a rubber composition is adjusted by compounding a filler whose average primary particle size is equal to or less than a predetermined value, so that it becomes hard for chipping to occur even in the case where the lateral groove is deep, (4) dispersibility of silica (filler) is improved by compounding a silane coupling agent, and (5) an excellent balance of wet grip performance and chipping resistance is achieved by setting the brittleness temperature of the rubber layer of the tread and a ratio of a groove depth at the deepest part of the groove bottom of the lateral groove neither of both ends of which opens into the circumferential grooves to a thickness of the entire tread within predetermined ranges. Additionally, it is considered that a remarkable effect of obtaining wet grip performance and chipping resistance in a wide temperature range in a well-balanced manner at a high level is achieved by cooperating the features (1) to (5).

The tire according to the present disclosure preferably comprises a resin component.

When the tire comprises a resin component, wet grip performance can be further improved.

A content of the silica in the filler is preferably 30 to 95% by mass.

When the content of the silica is within the above-described range, dispersion of the filler becomes uniform (the dispersibility is improved), so that effects of the present disclosure can be more improved.

The rubber composition preferably comprises 2.8 parts by mass or more of a silane coupling agent based on 100 parts by mass of the rubber component.

By setting a lower limit value of the content of the silane coupling agent as described above, dispersion of silica (filler) is improved, so that the effects of the present disclosure can be more improved.

The rubber component preferably comprises 7 to 40% by mass of an isoprene-based rubber, 25 to 60% by mass of a styrene-butadiene rubber, and 10 to 40% by mass of a butadiene rubber.

By setting contents of these three rubber components to be within the above-described ranges, the brittleness temperature of the rubber composition is decreased, so that chipping resistance at a low temperature can be improved.

An elongation at break of the rubber composition under an atmosphere at −30° C. in accordance with JIS K 6251: 2017 is preferably 340% or more.

By setting a lower limit value of the elongation at break under the atmosphere at −30° C. as described above, chipping resistance at a low temperature is more improved.

A tan δ of the rubber composition at 0° C. is preferably 0.35 or more.

By setting a lower limit value of the tan δ of the rubber composition at 0° C. as described above, wet grip performance is more improved.

Definition

A "standardized rim" is a rim defined for each tire in a standard system including a standard, on which the tire is based, by the standard, for example, a "standard rim" in JATMA, "Design Rim" in TRA, or "Measuring Rim" in ETRTO. Besides, in a case of a tire whose size is not defined in the above-described standard system, the "standardized rim" is defined as a rim that can be rim-assembled to such a tire and that has the narrowest width among rims having a minimum diameter and not causing air leakage between the rims and the tire.

A "standardized internal pressure" is an air pressure defined for each tire in a standard system including a standard, on which the tire is based, by each standard, i.e., the "MAXIMUM AIR PRESSURE" in JATMA, the maximum value described in the table "TIRE LOAD LIMITS AT VARIOUS COLD INFLATION PRESSURES" in TRA, or "INFLATION PRESSURE" in ETRTO. In a case of a tire whose size is not defined in the standard, the standardized internal pressure is defined as being 250 kPa.

A "standardized state" is a state in which the tire is rim-assembled to a standardized rim, filled with a standardized internal pressure, and applied with no load. Besides, in a case of a tire whose size is not defined in the above-described standard system, the standardized state is defined as a state in which the tire is rim-assembled to the rim having the minimum diameter, filled with a pressure of 250 kPa, and applied with no load.

A "standardized load" means a load defined in a standard system including a standard, on which the tire is based. The "standardized load" is the "MAXIMUN LOAD CAPACITY" in JATMA, the maximum value described in the table "TIRE LOAD LIMITS AT VARIOUS COLD INFLATION PRESSURES" in TRA, or "LOAD CAPACITY" in ETRTO.

<Measuring Method>

The "brittleness temperature" is a value of "50% brittleness temperature by impact" measured using a vulcanized rubber composition in accordance with JIS K 6261-2:2017 "Rubber, vulcanized or thermoplastic-Determination of low-temperature properties-Part 2: Low-temperature brittleness".

The "tan δ at 0° C." is a loss tangent measured under a condition of a temperature at ° C., a frequency of 10 Hz, an initial strain of 10%, a dynamic strain of 2.5%, and an extension mode. A sample for measurement of the loss tangent is a vulcanized rubber composition having a length of 20 mm, a width of 4 mm, and a thickness of 1 mm. In a case where the sample is prepared by cutting out the sample from a tire, the sample is cut out from a tread part of the tire.

The "elongation at break (EB) under the atmosphere at −30° C." is a value of an elongation at break (EB) measured by carrying out a tensile test in accordance with JIS K 6251:2017 "Rubber, vulcanized or thermoplastic-Determination of tensile stress-strain properties" using a specimen of dumbbell-shaped No. 7 under a condition of a temperature at −30° C. and a tension rate of 200 mm/sec.

A "styrene content" is a value calculated by $^1$H-NMR measurement and is applied to, for example, a rubber component having a repeating unit derived from styrene such as a SBR.

A "vinyl content (1,2-bond butadiene unit amount)" is a value calculated in accordance with JIS K 6239-2:2017 by infrared absorption spectrometry and is applied to, for example, a rubber component having a repeating unit derived from butadiene such as a SBR and a BR.

A "cis content (cis-1,4-bond butadiene unit amount)" is a value calculated in accordance with JIS K 6239-2:2017 by infrared absorption spectrometry and is applied to, for example, a rubber component having a repeating unit derived from butadiene such as a BR.

A "weight-average molecular weight (Mw)" can be calculated in terms of a standard polystyrene based on measurement values obtained by a gel permeation chromatography (GPC) (for example, GPC-8000 Series manufactured by Tosoh Corporation, detector: differential refractometer, column: TSKGEL SUPERMULTIPORE HZ-M manufactured by Tosoh Corporation). For example, the Mw is applied to, for example, a SBR, a BR, a resin component, a liquid rubber, and the like.

An "average primary particle size of silica" can be calculated by observing silica with a transmission or scanning electron microscope, measuring 400 or more primary particles of silica observed in the field of view, and averaging them.

A "$N_2$SA of silica" is measured in accordance with ASTM D3037-93 by a BET method.

A "$N_2$SA of carbon black" is measured in accordance with JIS K 6217-2 "Carbon black for rubber industry—Fundamental characteristics—Part 2: Determination of specific surface area—Nitrogen adsorption methods—Single-point procedures".

A "softening point of the resin component" is a temperature at which a sphere drops when the softening point specified in JIS K 6220-1: 2001 is measured with a ring and ball softening point measuring device.

<<Tire>>

A tire comprising a tread that is one embodiment of the present disclosure will be described below in detail with reference to drawings as necessary. However, the following descriptions and the drawings are illustrative for explaining the present disclosure, and are not intended to limit the technical scope of the present disclosure to this description range only. Besides, in the present specification, a numerical range identified with "to" means to include the numerical values of both ends.

In the present disclosure, the tread has at least one rubber layer. The tread of the present disclosure may be a tread consisting of a single rubber layer or may comprise a rubber layer (cap rubber layer) of a tread surface, and a rubber layer (base rubber layer) adjacent to an outer side of a belt layer in a tire radial direction. Moreover, as long as the object of the present disclosure can be achieved, one or two or more rubber layers may be further provided between the cap rubber layer and the base rubber layer. In the present disclosure, the tread preferably has the cap rubber layer and the base rubber layer.

In the present disclosure, a thickness of the cap rubber layer is, but not particularly limited to, preferably 2.5 mm or more, more preferably 3.0 mm or more, further preferably 3.5 mm or more. Moreover, the thickness of the cap rubber layer is preferably 6.0 mm or less, more preferably 5.0 mm or less, further preferably 4.0 mm or less, particularly preferably 3.0 mm or less.

In the present disclosure, a thickness of the base rubber layer is, but not particularly limited to, preferably 0.5 mm or more, more preferably 1.0 mm or more, further preferably 1.5 mm or more. Moreover, the thickness of the base rubber layer is preferably 6.0 mm or less, more preferably 5.0 mm or less, further preferably 4.0 mm or less, particularly preferably 3.0 mm or less.

In the present disclosure, a thickness of the entire tread is a sum of the thickness of the cap rubber layer and the thickness of the base rubber layer in the case where the tread is composed of the cap rubber layer and the base rubber layer. Moreover, in the present disclosure, the thickness of the entire tread is preferably 6.5 mm or more, more preferably 7.0 mm or more, further preferably 8.0 mm or more, most preferably 8.5 mm or more. Furthermore, in the case where one or two or more rubber layers are further provided between the cap rubber layer and the base rubber layer, the thickness of the entire tread is a sum of thicknesses of all the rubber layers. The thickness of the entire tread is preferably 10.5 mm or less, more preferably 10.0 mm or less, further preferably 9.5 mm or less, particularly preferably 9.0 mm or less. Besides, in the present specification, the thickness of the entire tread refers to a direct distance from an outermost surface of the tread part on the tire equatorial plane to an outermost part of the band on a cross-sectional plane obtained by cutting the tire along a plane including a rotation axis of the tire. In the case that a circumferential groove is provided on the tire equatorial plane, the entire tread is measured under the assumption that the groove is filled.

Figure 1:
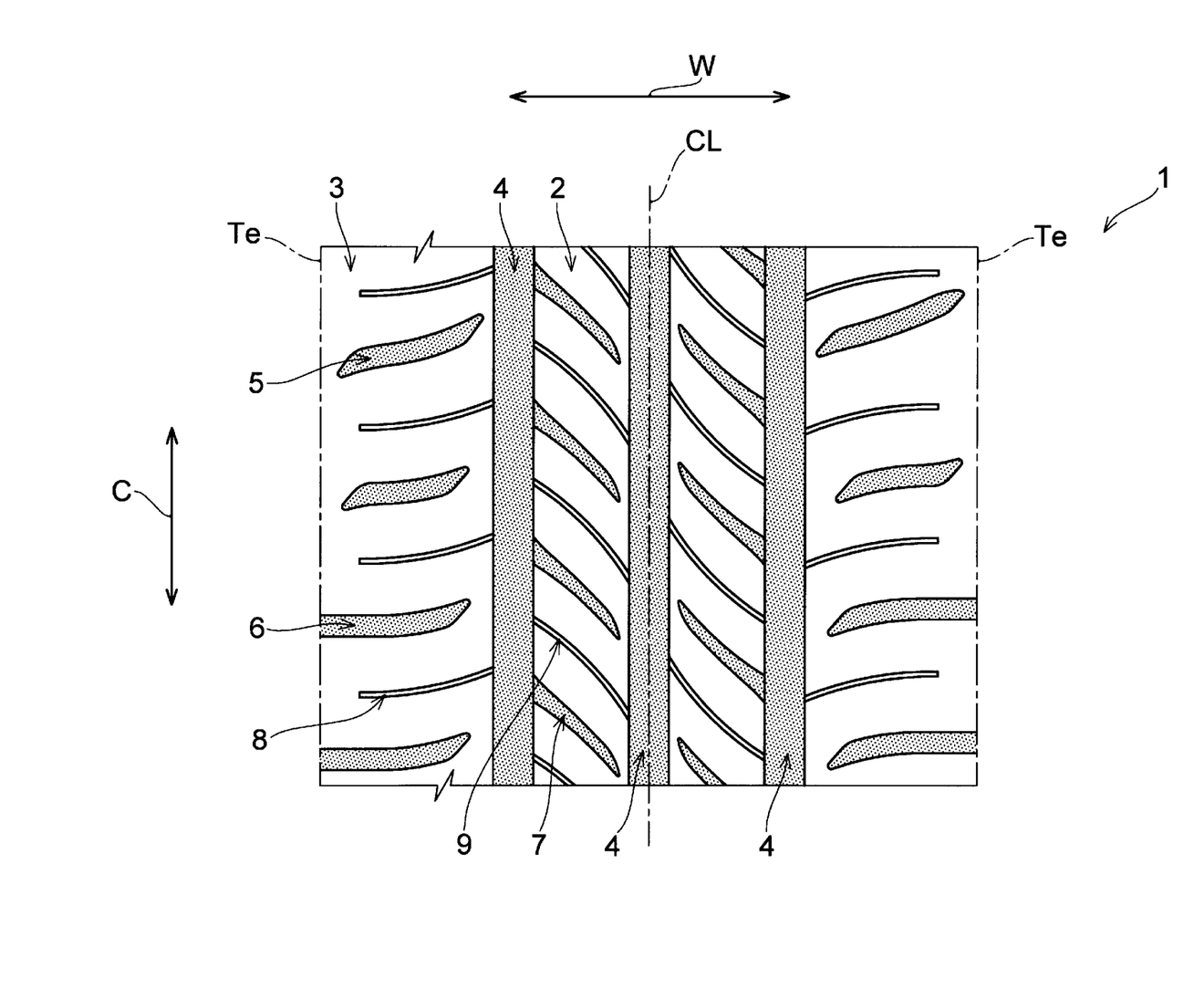
FIG. 1 is a schematic view of a tire when a tread is pressed against a flat surface.

FIG. 1 is a schematic view of a grounding surface when the tread is pressed against a flat surface. A tread pattern is formed on a tread surface 1 of the tire according to the present disclosure.

In FIG. 1, the tread has a plurality of circumferential grooves 4. Although the circumferential grooves 4 extend linearly in a circumferential direction C, the present disclosure is not limited to such an aspect, for example, the circumferential grooves may extend, in the circumferential direction, in a wavy, sinusoidal, or zig-zag shape. Although three circumferential grooves 4 are provided in FIG. 1, the number of circumferential grooves is not particularly limited in the present disclosure and may be, for example, two to five.

A groove depth of the circumferential groove is preferably 4.0 mm or more, more preferably 4.5 mm or more, further preferably 5.0 mm or more, particularly preferably 5.5 mm or more, from the viewpoint of wet grip performance. Moreover, the groove depth is preferably 9.0 mm or less, more preferably 8.0 mm or less, further preferably 7.0 mm or less, from the viewpoint of chipping resistance.

A ratio of the groove depth of the circumferential groove to the thickness of the entire tread is preferably 0.5 or more, more preferably 0.6 or more, further preferably 0.65 or more. Moreover, the ratio of the groove depth of the circumferential groove 4 to the thickness of the entire tread is preferably 0.9 or less, more preferably 0.85 mm or less, further preferably 0.8 mm or less.

Besides, in the present specification, the groove depth of the circumferential groove refers to a length of a normal line drawn from the tread surface to the groove bottom of the deepest circumferential groove of the plurality of circumferential grooves.

In FIG. 1, the tread has a center land part 2 that is partitioned by the circumferential grooves 4 and that is located between a shoulder land part 3 and a shoulder land part 3 in a tread width direction W.

The shoulder land parts are land parts provided at both ends in the width direction W, and the center land part is a land part provided in a central part in the tread width direction.

At least one of the land parts has one or more lateral grooves each having both ends, neither of which opens into the circumferential grooves, a groove depth at the deepest part of the groove bottom of the one or more lateral grooves being 80% or more of the thickness of the entire tread. Although lateral grooves 5 and 6 each having both ends neither of which opens into the circumferential grooves are provided on the shoulder land parts 3 in FIG. 1, the present disclosure is not limited to such an aspect.

Moreover, in addition to such lateral grooves, a lateral groove whose one end opens into a circumferential groove and a lateral groove and/or a sipe whose both ends open into circumferential grooves may be provided. In FIG. 1, the shoulder land parts 3 are provided with a plurality of sipes 8 each having one end that opens into a circumferential groove 4, and the center land part 2 is provided with a plurality of lateral grooves 7 whose one end opens into a circumferential groove 4 and a plurality of center sipes 9 each having both ends that opens into circumferential grooves 4. However, the present disclosure is not limited to such an aspect. Besides, in the present specification, "grooves" including the circumferential grooves and the lateral grooves refer to depressions each having a width larger than 2.0 mm. On the other hand, in the present specification, the "sipes" refer to narrow notches each having a width of 2.0 mm or less, preferably 0.5 to 2.0 mm.

In the present disclosure, the groove depth H at the deepest part of the groove bottom of the lateral groove neither of both ends of which opens into the circumferential grooves is preferably 3.6 mm or more, more preferably 4.0 mm or more, further preferably 4.5 mm or more, particularly preferably 4.9 mm or more, from the viewpoint of wet grip performance. Moreover, the groove depth H is preferably 8.1 mm or less, more preferably 7.5 mm or less, further preferably 7.3 mm or less, from the viewpoint of chipping resistance.

A ratio B of the groove depth H at the deepest part of the groove bottom of the lateral groove neither of both ends of which opens into the circumferential grooves to the thickness of the entire tread is 0.80 mm or more, preferably 0.82 mm or more, more preferably 0.85 mm or more. An upper limit of the ratio B of the groove depth at the deepest part of the lateral groove to the thickness of the entire tread is, but not particularly limited to, preferably 0.98 or less, more preferably 0.95 or less, further preferably 0.92 or less, from the viewpoint of the effects of the present disclosure.

Besides, in the present specification, the groove depth of lateral groove refers to a length of a normal line drawn from the tread surface to the groove bottom of the deepest lateral groove of the lateral grooves.

<Physical Properties of Rubber Composition>

A brittleness temperature A (° C.) of the rubber composition of the rubber layer (cap rubber layer) of the tread surface is −40° C. or less, preferably −42° C. or less, more preferably −45° C. or less, further preferably −50° C. or less. When the brittleness temperature is within the above-described range, it becomes hard for the rubber composition to undergo a brittle fracture even at a low temperature, so that chipping resistance at a low temperature is improved. Moreover, the brittleness temperature of the rubber composition of the cap rubber layer is preferably −70° C. or more, more preferably −65° C., further preferably −60° C. or more, from the viewpoint of the effects of the present disclosure. A brittleness temperature of a rubber composition of the base rubber layer is not particularly limited.

When the brittleness temperature of the rubber composition of the cap rubber layer is defined as A (° C.) and the ratio of the groove depth H at the deepest part of the groove bottom of the lateral groove neither of both ends of which opens into the circumferential grooves to the thickness of the entire tread is defined as B, A/B is −75 to −50. A/B is preferably −73 or more, more preferably −70 or more. Moreover, A/B is preferably −51 or less, more preferably −56 or less, further preferably −58 or less, particularly preferably −60 or less. By setting the brittleness temperature of the rubber layer of the tread and the ratio of the groove depth at the deepest part of the groove bottom of the lateral groove to the thickness of the entire tread within the above-described ranges, the balance of wet grip performance and chipping resistance can be improved.

An elongation at break, under an atmosphere at −30° C., of the rubber composition of the cap rubber layer is preferably 340% or more, more preferably 350% or more, further preferably 370% or more, particularly preferably 390% or more, from the viewpoint of chipping resistance. Moreover, the elongation at break, under the atmosphere at −30° C., of the rubber composition of the cap rubber layer is, but not particularly limited to, usually 550% or less. Besides, an elongation at break, under an atmosphere at −30° C., of the rubber composition of the base rubber layer is not particularly limited.

A tan δ, at 0° C., of the rubber composition of the cap rubber layer is preferably 0.32 or more, more preferably 0.35 or more, further preferably 0.38 or more, particularly preferably 0.40 or more, from the viewpoint of wet grip performance. Moreover, the tan δ, at 0° C., of the rubber composition of the cap rubber layer is preferably 0.80 or less, more preferably 0.75 or less, particularly preferably 0.70 or less, from the viewpoint of the effects of the present disclosure. Besides, a tan δ, at 0° C., of the rubber composition of the base rubber layer is not particularly limited.

[Rubber Composition]

The rubber composition of the tread according to the present disclosure will be described below.

<Rubber Component>

The rubber layer (cap rubber layer) of the tread surface according to the present disclosure comprises an isoprene-based rubber and a styrene-butadiene rubber (SBR) as rubber components. Preferably, three components of the isoprene-based rubber, the SBR, and a butadiene rubber (BR) are used in combination. More preferably, the rubber component is a rubber component consisting of three components of an isoprene-based rubber, a SBR, and a BR. Moreover, the rubber component can also be prepared as a rubber component consisting of an isoprene-based rubber and a SBR. Besides, a rubber component of the rubber composition of the base rubber layer preferably comprises an isoprene-based rubber, more preferably comprises an isoprene-based rubber and a BR, or may be prepared as a rubber component consisting of an isoprene-based rubber and a BR.

(Isoprene-Based Rubber)

Examples of the isoprene-based rubber include a natural rubber (NR), an isoprene rubber (IR), a reformed NR, a modified NR, a modified IR, and the like. As the NR, those common in the tire industry can be used, examples of which include, for example, SIR20, RSS #3, TSR20, etc. The IR is not particularly limited, and those common in the tire industry can be used, examples of which include, for example, IR2200, etc. Examples of the reformed NR can include a deproteinized natural rubber (DPNR), an ultrapure natural rubber, etc., examples of the modified NR can include an epoxidized natural rubber (ENR), a hydrogenated natural rubber (HNR), a grafted natural rubber, etc., and examples of the modified IR can include an epoxidized isoprene rubber, a hydrogenated isoprene rubber, a grafted isoprene rubber, etc. These isoprene-based rubbers may be used alone, or two or more thereof may be used in combination.

A content of the isoprene-based rubber (preferably NR) in 100% by mass of the rubber component of the rubber composition of the cap rubber layer is preferably 5% by mass or more, more preferably 7% by mass or more, further preferably 8% by mass or more, particularly preferably 9% by mass or more, most preferably 10% by mass or more, from the viewpoint of chipping resistance. On the other hand, the content of the isoprene-based rubber in 100% by mass of the rubber component of the rubber composition of the cap rubber layer is preferably 40% by mass or less, more preferably 30% by mass or less, further preferably 25% by mass or less, particularly preferably 20% by mass or less. Besides, a content of the isoprene-based rubber when compounded in 100% by mass of the rubber component of the rubber composition of the base rubber layer can be, but not particularly limited to, for example, 10% by mass or more, 30% by mass or more, 40% by mass or more, 50% by mass or more, or 60% by mass or more.

(SBR)

The SBR is not particularly limited, examples of which include a solution-polymerized SBR (S-SBR), an emulsion-polymerized SBR (E-SBR), modified SBRs (a modified S-SBR, a modified E-SBR) thereof, and the like. Examples of the modified SBR include a SBR modified at its terminal and/or main chain, a modified SBR coupled with tin, a silicon compound, etc. (a modified SBR of condensate or having a branched structure, etc.), and the like. Furthermore, hydrogenated ones of these SBRs (hydrogenated SBRs) and the like can also be used. Among them, a modified E-SBR and a modified S-SBR are preferable.

Examples of the modified SBR include a modified SBR into which a functional group usually used in this field is introduced. Examples of the above-described functional group include, for example, an amino group (preferably an amino group whose hydrogen atom is substituted with an alkyl group having 1 to 6 carbon atoms), an amide group, a silyl group, an alkoxysilyl group (preferably an alkoxysilyl group having 1 to 6 carbon atoms), an isocyanate group, an imino group, an imidazole group, an urea group, an ether group, a carbonyl group, an oxycarbonyl group, a mercapto group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group (preferably an alkoxy group having 1 to 6 carbon atoms), a hydroxyl group, an oxy group, an epoxy group, etc. Besides, these functional groups may each have a substituent. Examples of the substituent include functional groups such as, for example, an amino group, an amide group, an alkoxysilyl group, a carboxyl group, and a hydroxyl group. Moreover, examples of the modified SBR can include a hydrogenated SBR, an epoxidized SBR, a tin-modified SBR, etc.

An oil-extended SBR or a non-oil extended SBR can be used as a SBR. When the oil-extended SBR is used, an oil-extending amount of the SBR, that is, a content of an extending oil contained in the SBR is preferably 10 to 50 parts by mass based on 100 parts by mass of a rubber solid content of the SBR.

The SBRs recited above may be used alone, or two or more thereof may be used in combination. As the SBRs recited above, for example, those commercially available from Sumitomo Chemical Co., Ltd., JSR Corporation, Asahi Kasei Corporation, Zeon Corporation, ZS Elastomer Co., Ltd., etc. can be used.

A styrene content of the SBR is preferably 15% by mass or more, more preferably 18% by mass or more, further preferably 20% by mass or more, from the viewpoints of securing damping property at the tread part and wet grip performance. Moreover, it is preferably 60% by mass or less, more preferably 50% by mass or less, further preferably 45% by mass or less, from the viewpoints of temperature dependency of grip performance and abrasion resistance. Besides, in the present specification, the styrene content of the SBR is calculated by the above-described measuring method.

A vinyl content of the SBR is preferably 10 mol % or more, more preferably 13 mol % or more, further preferably 16 mol % or more, from the viewpoints of ensuring reactivity with the filler, rubber strength, and abrasion resistance. Moreover, the vinyl content of the SBR is preferably 70 mol % or less, more preferably 65 mol % or less, further preferably 60 mol % or less, from the viewpoints of prevention of increase in temperature dependence, wet grip performance, elongation at break, and abrasion resistance. Besides, in the present specification, the vinyl content of the SBR (1,2-bond butadiene unit amount) is measured by the above-described measuring method.

A weight-average molecular weight (Mw) of the SBR is preferably 150,000 or more, more preferably 200,000 or more, further preferably 250,000 from the viewpoint of abrasion resistance. Moreover, the Mw is preferably 2,500,000 or less, more preferably 2,000,000 or less, from the viewpoints of cross-linking uniformity and the like. Besides, the Mw can be calculated by the above-described measuring method.

A content of the SBR in 100% by mass of the rubber component of the rubber composition of the cap rubber layer is preferably 25% by mass or more, more preferably 30% by mass or more, further preferably 35% by mass or more, particularly preferably 40% by mass or more, from the viewpoint of securing damping property at the tread part. Moreover, it is preferably 80% by mass or less, more preferably 75% by mass or less, further preferably 65% by mass or less, particularly preferably 60% by mass or less, from the viewpoint of suppressing heat generation from the tread part. Besides, a content of the SBR when compounded in 100% by mass of the rubber component of the rubber composition of the base rubber layer is not particularly limited.

(BR)

The BR is not particularly limited, and those common in the tire industry can be used such as, for example, a BR having a cis content less than 50% by mass (a low cis BR), a BR having a cis content of 90% by mass or more (a high cis BR), a rare-earth-based butadiene rubber synthesized using a rare-earth element-based catalyst (a rare-earth-based BR), a BR containing a syndiotactic polybutadiene crystal (a SPB-containing BR), and a modified BR (a high cis modified BR, a low cis modified BR). Examples of the modified BR include BRs modified with the similar functional groups as described above for the SBR. These BRs may be used alone, or two or more thereof may be used in combination.

As the high cis BR, for example, those commercially available form Zeon Corporation, Ube Industries, Ltd., JSR Corporation, and the like can be used. When the high cis BR is compounded, low temperature characteristics and abrasion resistance can be improved. The cis content is preferably 95% by mass or more, more preferably 96% by mass or more, further preferably 97% by mass or more, particularly preferably 98% by mass or more. Besides, in the present specification, the cis content (cis-1,4-bond butadiene unit amount) is a value calculated by the above-described measuring method.

As the rare-earth-based BR, those which are synthesized using a rare-earth element-based catalyst, and have a vinyl content of preferably 1.8 mol % or less, more preferably 1.0 mol % or less, further preferably 0.8 mol % or less, and a cis content preferably 95% by mass or more, more preferably 96% or more, further preferably 97% by mass or more, particularly preferably 98% by mass or more, can be used. As rare-earth-based BR, for example, those commercially available from LANXESS, etc. can be used.

Examples of the SPB-containing BR include those in which 1,2-syndiotactic polybutadiene crystal is chemically bonded with BR and dispersed, but not those in which the crystal is simply dispersed in the BR. As such a SPB-containing BR, those commercially available from Ube Industries, Ltd., etc. can be used.

As the modified BR, a modified butadiene rubber (modified BR) is appropriately used which is modified with a functional group and whose terminal and/or main chain include at least one element selected from a group consisting of silicon, nitrogen, and oxygen.

Examples of other modified BRs include those obtained by adding a tin compound after polymerizing 1,3-butadiene by a lithium initiator, the terminal of which is further bonded by tin-carbon bond (tin-modified BRs), and the like. Moreover, the modified BR may be either non-hydrogenated or hydrogenated.

The BRs recited above may be used alone, or two or more thereof may be used in combination.

A weight-average molecular weight (Mw) of the BR is preferably 300,000 or more, more preferably 350,000 or more, further preferably 400,000 or more, from the viewpoint of abrasion resistance. Moreover, it is preferably 2,000,000 or less, more preferably 1,000,000 or less, from the viewpoints of cross-linking uniformity and the like. Besides, the Mw can be calculated by the above-described measuring method.

A content of the BR in 100% by mass of the rubber component of the rubber composition of the cap rubber layer is preferably 5% by mass or more, more preferably 10% by mass or more, further preferably 15% by mass or more, particularly preferably 20% by mass or more, from the viewpoint of chipping resistance. Moreover, it is preferably 50% by mass or less, more preferably 45% by mass or less, further preferably 40% by mass or less, particularly preferably 35% by mass or less, from the viewpoint of wet grip performance. Besides, a content of the BR when compounded in 100% by mass of the rubber component of the rubber composition of the base rubber layer is not particularly limited.

(Other Rubber Components)

The rubber component according to the present disclosure may comprise rubber components other than the above-described isoprene-based rubber, SBR, and BR. A cross-linkable rubber component commonly used in the tire industry can be used as another rubber component, examples of which include, for example, diene-based rubbers such as a styrene-isoprene-butadiene copolymer rubber (SIBR), a styrene-isobutylene-styrene block copolymer (SIBS), a chloroprene rubber (CR), an acrylonitrile-butadiene rubber (NBR), and non-diene-based rubbers such as a hydrogenated nitrile rubber (HNBR), a butyl rubber (IIR), an ethylene propylene rubber, a silicone rubber, a polyethylene chloride rubber, a fluororubber (FKM), an acrylic rubber (ACM), and a hydrin rubber. These other rubber components may be used alone, or two or more thereof may be used in combination.

<Filler>

The rubber layer (cap rubber layer) of the tread surface according to the present disclosure comprises a filler. As the filler, silica and carbon black are appropriately used, and the filler preferably comprises silica. Although the rubber composition of the base rubber layer may not comprise a filler, it preferably comprises a filler. The rubber composition of the base rubber layer preferably comprises carbon black as a filler, and it may comprise a filler consisting of carbon black.

Uniformity of the filler and the rubber becomes important for achievement of the effects of the present disclosure. When dispersion of the filler becomes non-uniform, it becomes easy for the rubber to generate heat due to stress concentration, making it easy for chip cutting and block chipping of the rubber to occur.

(Silica)

Silica is not particularly limited, and those common in the tire industry can be used, such as, for example, silica prepared by a dry process (anhydrous silica) and silica prepared by a wet process (hydrous silica). Among them, hydrous silica prepared by a wet process is preferable from the reason that it has many silanol groups. As the silica, for example, those manufactured and sold by Evonik Degussa GmbH, Solvay, Tosoh Silica Corporation, Tokuyama Corporation, etc. can be used. These silica may be used alone, or two or more thereof may be used in combination.

An average primary particle size of silica is preferably 20 nm or less, more preferably 18 nm or less, further preferably 16 nm or less, particularly preferably 15 nm or less. A lower limit of the average primary particle size is, but not particularly limited to, preferably 1 nm or more, more preferably 3 nm or more, further preferably 5 nm or more. When the average primary particle size of silica is within the above-described ranges, dispersibility of silica can be more improved, and reinforcing property, wet grip performance, and abrasion resistance can be further improved. Besides, the average primary particle size of silica is measured by the above-described measuring method.

A nitrogen adsorption specific surface area ($N_2SA$) of silica is preferably 140 $m^2/g$ or more, more preferably 150 $m^2/g$ or more, further preferably 160 $m^2/g$ or more, particularly preferably 170 $m^2/g$ or more, from the viewpoints of reinforcing property and securement of damping property at the tread part. Moreover, it is preferably 350 $m^2/g$ or less, more preferably 300 $m^2/g$ or less, further preferably 250 $m^2/g$ or less, from the viewpoints of heat generation and processability. Besides, the $N_2SA$ of silica is a value measured by the above-described measuring method.

A content of silica in the filler in the rubber composition of the cap rubber layer is preferably 30% by mass or more, more preferably 40% by mass or more, further preferably 45% by mass or more, particularly preferably 50% by mass or more, most preferably 55% by mass or more, from the viewpoint of dispersibility of silica. Moreover, the content of silica in the filler in the rubber composition of the cap rubber layer is preferably 95% by mass or less, more preferably 35% by mass or less, particularly preferably 75% by mass or less, most preferably 65% by mass or less, from the viewpoint of the effects of the present disclosure. Besides, a content of silica in the filler in the rubber composition of the base rubber layer is not particularly limited.

A content of silica based on 100 parts by mass of the rubber component in the rubber composition of the cap rubber layer is preferably 25 parts by mass or more, more preferably 30 parts by mass or more, further preferably 35 parts by mass or more, particularly preferably 40 parts by mass or more, from the viewpoint of reinforcing property. Moreover, it is preferably 120 parts by mass or less, more preferably 105 parts by mass or less, further preferably 95 parts by mass or less, particularly 90 parts by mass or less, from the viewpoint of reducing specific gravity of the rubber to reduce the weight and from the viewpoint of improving chipping resistance by suppressing heat generation of the tread part. Besides, a content of silica based on 100 parts by mass of the rubber component in the rubber composition of the base rubber layer is not particularly limited.

(Carbon Black)

Carbon black is not particularly limited, and those common in the tire industry can be used such as GPF, FEF, HAF, ISAF, and SAF. Specifically, N110, N115, N120, N125, N134, N135, N219, N220, N231, N234, N293, N299, N326, N330, N339, N343, N347, N351, N356, N358, N375, N539, N550, N582, N630, N642, N650, N660, N683, N754, N762, N765, N772, N774, N787, N907, N908, N990, N991, and the like can be appropriately used, and in addition to the above-described types of carbon black, in-house synthesized products and the like can also be appropriately used. These carbon black may be used alone, or two or more thereof may be used in combination.

A nitrogen adsorption specific surface area ($N_2SA$) of carbon black is preferably 50 $m^2/g$ or more, more preferably 70 $m^2/g$ or more, further preferably 100 $m^2/g$ or more, from the viewpoints of weather resistance and reinforcing property. Moreover, it is preferably 250 m$^2$/g or less, more preferably 220 m$^2$/g or less, from the viewpoints of dispersibility, fuel efficiency, fracture characteristics, and durability. Besides, the N$_2$SA of carbon black is a value measured by the above-described measuring method.

A content of carbon black when compounded based on 100 parts by mass of the rubber component in the rubber composition of the cap rubber layer is preferably 1 parts by mass or more, more preferably 3 parts by mass or more, further preferably 5 parts by mass or more, from the viewpoints of weather resistance and reinforcing property. Moreover, it is preferably 40 parts by mass or less, more preferably 30 parts by mass or less, further preferably 20 parts by mass or less, particularly preferably 10 parts by mass or less from the viewpoint of improvement in chipping resistance by suppressing heat generation of the tread part. Besides, a content of carbon black when compounded based on 100 parts by mass of the rubber component in the rubber composition of the base rubber layer is preferably 20 to 100 parts by mass, more preferably 25 to 80 parts by mass, further preferably 30 to 60 parts by mass.

The filler according to the present disclosure may include a filler other than silica and carbon black. As the filler other than silica and carbon black, any filler commonly used in the tire industry can be used, examples of which include, for example, aluminum hydroxide, alumina (aluminum oxide), clay, calcium carbonate, mica, etc.

A total content of fillers based on 100 parts by mass of the rubber component in the rubber composition of the cap rubber layer is preferably 40 parts by mass or more, more preferably 50 parts by mass or more, further preferably 60 parts by mass or more, particularly preferably 65 parts by mass or more, most preferably 68 parts by mass or more, from the viewpoint of reinforcing property. Moreover, it is preferably 130 parts by mass or less, more preferably 115 parts by mass or less, further preferably 100 parts by mass or less, particularly 95 parts by mass or less, from the viewpoint of reducing specific gravity of the rubber to reduce the weight and from the viewpoint of improving chipping resistance by suppressing heat generation of the tread part. A total content of fillers based on 100 parts by mass of the rubber component in the rubber composition of the base rubber layer is preferably 20 to 100 parts by mass or more, more preferably 25 to 80 parts by mass or more, further preferably 30 to 60 parts by mass or more.

<Silane Coupling Agent>

A silane coupling agent is used in combination with the filler for the rubber layer (cap rubber layer) of the tread surface according to the present disclosure. The silane coupling agent is not particularly limited, and any silane coupling agent conventionally used in combination with silica in the tire industry can be used, examples of which include, for example, mercapto-based silane coupling agents described below; sulfide-based silane coupling agents such as bis(3-triethoxysilylpropyl)disulfide and bis(3-triethoxysilylpropyl)tetrasulfide; thioester-based silane coupling agents such as 3-octanoylthio-1-propyltriethoxysilane, 3-hexanoylthio-1-propyltriethoxysilane, and 3-octanoylthio-1-propyltrimethoxysilane; vinyl-based silane coupling agents such as vinyltriethoxysilane and vinyltrimethoxysilane; amino-based silane coupling agents such as 3-aminopropyltriethoxysilane, 3-aminopropyltrimethoxysilane, and 3-(2-aminoethyl)aminopropyltriethoxysilane; glycidoxy-based silane coupling agents such as γ-glycidoxypropyltriethoxysilane and γ-glycidoxypropyltrimethoxysilane; nitro-based silane coupling agents such as 3-nitropropyltrimethoxysilane and 3-nitropropyltriethoxysilane; and chloro-based silane coupling agents such as 3-chloropropyltrimethoxysilane and 3-chloropropyltriethoxysilane. Among them, sulfide-based silane coupling agents and/or mercapto-based silane coupling agents are preferable, and sulfide-based silane coupling agents are more preferable from the viewpoint of processability. These silane coupling agents may be used alone, or two or more thereof may be used in combination. The rubber composition of the base rubber layer may not comprise a silane coupling agent.

A content of the silane coupling agent based on 100 parts by mass of the rubber component is preferably 2.0 parts by mass or more, more preferably 2.4 parts by mass or more, further preferably 2.8 parts by mass or more, particularly preferably 3.0 parts by mass or more, from the viewpoint of enhancing dispersibility of silica to improve fuel efficiency. Moreover, it is preferably 20 parts by mass or less, more preferably 15 parts by mass or less, further preferably 12 parts by mass or less, particularly preferably 10 parts by mass or less, from the viewpoint of prevention of deterioration of chipping resistance.

(Other Compounding Agents)

The rubber composition of the tread according to the present disclosure can appropriately comprise compounding agents conventionally and commonly used in the tire industry, such as, for example, a resin component, oil, an antioxidant, wax, zinc oxide, stearic acid, processing aid, a cross-linking agent such as sulfur, and a vulcanization accelerator, in addition to the above-described components.

(Resin Component)

In the present disclosure, the rubber composition of the cap rubber layer preferably comprises a resin component. Examples of the resin component include, but not particularly limited to, a petroleum resin, a terpene-based resin, a rosin-based resin, a phenol-based resin, etc., which are commonly used in the tire industry. Among them, an aromatic-based petroleum resin is preferable. These resin components may be used alone, or two or more thereof may be used in combination.

In the present specification, a "C5-based petroleum resin" means a resin obtained by polymerizing C5 fractions. Examples of C5 fractions include, for example, a petroleum fraction equivalent to 4 to 5 carbon atoms, such as cyclopentadiene, pentene, pentadiene, and isoprene. A dicyclopentadiene resin (DCPD resin) is appropriately used as a C5-based petroleum resin.

In the present specification, the "aromatic-based petroleum resin" means a resin obtained by polymerizing C9 fractions and may be those undergoing hydrogenation or modification. Examples of the C9 fractions include, for example, a petroleum fraction equivalent to 8 to 10 carbon atoms, such as vinyltoluene, alkylstyrene, indene, and methylindene. As specific examples of the aromatic-based petroleum resin, for example, a coumarone-indene resin, a coumarone resin, an indene resin, and an aromatic vinyl-based resin are appropriately used. As the aromatic vinyl-based resin, a homopolymer of α-methylstyrene or styrene or a copolymer of α-methylstyrene and styrene is preferable and a copolymer of α-methylstyrene and styrene is more preferable, because it is economical, easy to process, and excellent in thermogenetic property. As the aromatic vinyl-based resin, for example, those commercially available from Kraton Corporation, Eastman Chemical Company, and the like can be used.

In the present specification, a "C5-C9-based petroleum resin" means a resin obtained by polymerizing the C5 fractions and the C9 fractions and may be those undergoing hydrogeneration or modification. Examples of C5 fractions and C9 fractions include the above-described petroleum fractions. As the C5-C9-based petroleum resin, for example, those commercially available from Tosoh Corporation, LUHUA Chemical Co., Ltd., etc., are used.

Examples of the terpene-based resin include a polyterpene resin consisting of at least one selected from terpenic compounds such as α-pinene, β-pinene, limonene, and dipentene; an aromatic modified terpene resin made from a terpenic compound described above and an aromatic compound, and a terpene phenol resin made from a terpenic compound and a phenol-based compound; and a resin obtained by hydrogenating these types of terpene-based resin (hydrogenated terpene-based resin). Examples of the aromatic compound from which the aromatic modified terpene resin is made include, for example, styrene, α-methylstyrene, vinyltoluene, divinyltoluene, and the like. Examples of the phenol-based compound from which the terpene phenol resin is made include, for example, phenol, bisphenol A, cresol, xylenol, and the like.

Examples of the rosin-based resin include, but not particularly limited to, for example, a natural rosin resin, a rosin-modified resin obtained by modifying the natural rosin resin by hydrogenation, disproportionation, dimerization, or esterification, and the like.

Examples of the phenol-based resin include, but not particularly limited to, a phenol formaldehyde resin, an alkylphenol formaldehyde resin, an alkyl phenol acetylene resin, an oil-modified phenol formaldehyde resin, and the like.

A content of the resin component when compounded based on 100 parts by mass of the rubber component in the rubber composition of the cap rubber layer is preferably 1 parts by mass or more, more preferably 2 parts by mass or more, further preferably 3 parts by mass or more, particularly preferably 4 parts by mass or more, from the viewpoint of wet grip performance. Moreover, it is preferably 50 parts by mass or less, more preferably 40 parts by mass or less, further preferably 35 parts by mass or less, particularly preferably 10 parts by mass or less, from the viewpoints of reduction in rolling resistance and abrasion resistance. Besides, a content of the resin component in the rubber composition of the base rubber layer is not particularly limited.

A softening point of the resin component is preferably 40° C. or higher, more preferably 60° C. or higher, further preferably 70° C. or higher, from the viewpoint of grip performance. Moreover, it is preferably 150° C. or lower, more preferably 140° C. or lower, further preferably 130° C. or lower, from the viewpoints of processability and improvement in dispersibility of the rubber component with the filler. Besides, the softening point of the resin component is measured by the above-described measuring method.

(Oil)

Examples of oil include, for example, aromatic oils, process oils, mineral oils such as paraffin oils, etc. Among them, process oils are preferably used from a reason of reduction of burden on the environment.

A content of oil when compounded based on 100 parts by mass of the rubber component is preferably 6 parts by mass or more, more preferably 7 parts by mass or more, further preferably 10 parts by mass or more, from the viewpoint of processability. Moreover, it is preferably 80 parts by mass or less, more preferably 75 parts by mass or less, further preferably 70 parts by mass or less, from the viewpoint of abrasion resistance. Besides, in the present specification, the content of oil also includes an amount of oil contained in an oil-extended rubber (Antioxidant)

Examples of the antioxidant include, but not particularly limited to, for example, each amine-based, quinoline-based, quinone-based, phenol-based, and imidazole-based compound, and antioxidants such as a carbamic acid metal salt, preferably, phenylenediamine-based antioxidants such as N-(1,3-dimethylbutyl)-N'-phenyl-p-phenylenediamine, N-isopropyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-4-methyl-2-pentyl-N'-phenyl-p-phenylenediamine, N,N'-diaryl-p-phenylenediamine, hindered diallyl-p-phenylenediamine, phenylhexyl-p-phenylenediamine, and phenyloctyl-p-phenylenediamine, and quinoline-based antioxidants such as 2,2,4-trimethyl-1,2-dihydroquinoline polymer and 6-ethoxy-2,2,4-trimethyl-1,2-dihydroquinoline. These antioxidants may be used alone, or two or more thereof may be used in combination.

A content of the antioxidant when compounded based on 100 parts by mass of the rubber component is preferably 0.5 parts by mass or more, more preferably 1 parts by mass or more, from the viewpoint of ozone crack resistance of a rubber. Moreover, it is preferably 10 parts by mass or less, more preferably parts by mass or less, from the viewpoints of abrasion resistance and wet grip performance.

A content of wax when compounded based on 100 parts by mass of the rubber component is preferably 0.5 parts by mass or more, more preferably 1 parts by mass or more, from the viewpoint of weather resistance of a rubber. Moreover, it is preferably 10 parts by mass or less, more preferably parts by mass or less, from the viewpoint of whitening of a tire due to bloom.

A content of stearic acid when compounded based on 100 parts by mass of the rubber component is preferably 0.5 parts by mass or more, more preferably 1 parts by mass or more, from the viewpoint of processability. Moreover, it is preferably 10 parts by mass or less, more preferably 5 parts by mass or less, from the viewpoint of vulcanization rate.

A content of zinc oxide when compounded based on 100 parts by mass of the rubber component is preferably 0.5 parts by mass or more, more preferably 1 parts by mass or more, from the viewpoint of processability. Moreover, it is preferably 10 parts by mass or less, more preferably 5 parts by mass or less, from the viewpoint of abrasion resistance.

(Closs-Linking Agent)

Sulfur is appropriately used as a cross-linking agent. As sulfur, a powdery sulfur, an oil processing sulfur, a precipitated sulfur, a colloidal sulfur, an insoluble sulfur, a highly dispersible sulfur, and the like can be used.

A content of sulfur when compounded based on 100 parts by mass of the rubber component is preferably 0.1 parts by mass or more, more preferably 0.3 parts by mass or more, further preferably 0.5 parts by mass, from the viewpoint of securing a sufficient vulcanization reaction. Moreover, it is preferably 5.0 parts by mass or less, more preferably 4.0 parts by mass or less, further preferably 3.0 parts by mass or less, particularly preferably 2.5 parts by mass or less, from the viewpoint of prevention of deterioration. Besides, a content of the vulcanizing agent when an oil-containing sulfur is used as the cross-linking agent shall be a total content of pure sulfur contained in the oil-containing sulfur.

A well-known organic cross-linking agent can also be used as a cross-linking agent other than sulfur. The organic cross-linking agent is not particularly limited as long as it can form a cross-linking chain other than a polysulfide bond, examples of which include, for example, an alkylphenol-sulfur chloride condensate, sodium hexamethylene-1,6-bis-thiosulfate dihydrate, 1,6-bis(N,N'-dibenzylthiocarbamoyl dithio)hexan, dicumyl peroxide, etc., preferably 1,6-bis(N, N'-dibenzylthiocarbamoyl dithio)hexan. Those commercially available from Taoka Chemical Co., Ltd., LANXESS, Flexsys, etc. can be used as these organic cross-linking agents.

Examples of the vulcanization accelerator include, but not particularly limited to, for example, sulfenamide-based, thiazole-based, thiuram-based, thiourea-based, guanidine-based, dithiocarbamic acid-based, aldehyde-amine-based or aldehyde-ammonia-based, imidazoline-based, and xanthate-based vulcanization accelerators. Among them, sulfenamide-based and thiuram-based vulcanization accelerators are preferable from the viewpoint of obtaining a desired effect more appropriately, and these two vulcanization accelerators are preferably used in combination.

Examples of the sulfenamide-based vulcanization accelerator include CBS (N-cyclohexyl-2-benzothiazolyl sulfenamide), TBBS (N-(t-butyl)-2-benzothiazolyl sulfenamide), N-oxyethylene-2-benzothiazolyl sulfenamide, N,N'-diisopropyl-2-benzothiazolyl sulfenamide, N,N-dicyclohexyl-2-benzothiazolyl sulfenamide, and the like. Examples of the thiazole-based vulcanization accelerator include 2-mercaptobenzothiazole, dibenzothiazolyl disulfide, and the like. Examples of the thiuram-based vulcanization accelerator include tetramethylthiuram monosulfide, tetramethylthiuram disulfide, tetrabenzylthiuram disulfide (TBzTD), and the like. Examples of the guanidine-based vulcanization accelerator include diphenylguanidine (DPG), diorthotrilguanidine, orthotrilbiguanidine, and the like. These vulcanization accelerators may be used alone, or two or more thereof may be used in combination. Among them, a combination of CBS and TBzTD is particularly preferable from the viewpoint of obtaining a desired effect more effectively.

A content of the vulcanization accelerator when compounded based on 100 parts by mass of the rubber component is preferably 1 parts by mass or more, more preferably 2 parts by mass or more. Moreover, the content of the vulcanization accelerator based on 100 parts by mass of the rubber component is preferably 8 parts by mass or less, more preferably 7 parts by mass or less, further preferably 6 parts by mass or less. When the content of the vulcanization accelerator is within the above-described ranges, breaking strength and elongation tend to be secured.

The rubber composition according to the present disclosure can be produced by a known method. It can be produced by, for example, a method of kneading components other than a vulcanizing agent (cross-linking agent) and a vulcanization accelerator, of the above-described components, with a known kneading machine commonly used in the tire industry, such as a Banbury mixer, a kneader, and an open roll, and then adding the vulcanizing agent and the vulcanization accelerator to the kneaded product to further knead them, followed by vulcanizing them, and the like.

<Tire>

The tire of the present disclosure can be appropriately used as a tire for a passenger car, a tire for a large SUV, a tire for a truck/bus, a tire for a two-wheeled vehicle, a racing tire, a tire for a motorcycle, or the like. Besides, the tire for a passenger car refers to a tire that is presupposed to be mounted to a car running with four wheels and that has the maximum load capacity of 1000 kg or less. Moreover, the tire of the present disclosure can be used as an all-season tire, a summer tire, or a winter tire such as a studless tire.

The tire comprising the tread composed of the above-described rubber composition for tread can be produced using the above-described rubber composition for tread by a usual method. That is, the tire can be produced by extruding an unvulcanized rubber composition, in which the above-described components are compounded for the rubber component as appropriate, into a shape of a tread, attaching it together with other tire members on a tire forming machine, and molding them by a usual method to form an unvulcanized tire, followed by heating and pressurizing this unvulcanized tire in a vulcanizing machine.

EXAMPLE

The present disclosure will be described based on Examples, though the present disclosure is not limited to only Examples.

Various chemicals used in Examples and Comparative examples are collectively shown below.

NR: TSR20

SBR1: JSR1502 manufactured by JSR Corporation (E-SBR, styrene content: 23.5% by mass, vinyl content: 18 mol %, Mw: 250,000, a non-oil-extended product)

SBR2: modified solution-polymerized SBR produced as Production example 1 described below (styrene content: 38% by mass, vinyl content: 39 mol %, Mw:800,000, an oil-extended product obtained by adding 25 parts by weight of an oil component to 100 parts by weight of a SBR)

BR1: Nipol BR1220 manufactured by Zeon Corporation (BR obtained by polymerizing butadiene in the presence of a cobalt-based catalyst, cis content: 96% by mass, Tg: −105° C., Mw: 460,000)

BR2: CB24 manufactured by LANXESS (BR synthesized using a Nd-based catalyst, vinyl content: 0.7 mol %, cis content: 96% by mass, Mw: 500,000)

Carbon black 1: VULCAN 10H manufactured by Cabot Japan K.K. (N134, $N_2SA$: 144 $m^2/g$)

Carbon black 2: SHOW BLACK $N_{351}H$ manufactured by Cabot Japan K.K. ($N_2SA$: 69 $m^2/g$)

Silica 1: Ultrasil 9100GR manufactured by Evonik Degussa GmbH ($N_2SA$: 230 $m^2/g$, average primary particle size: 15 nm)

Silica 2: Ultrasil VN3 manufactured by Evonik Degussa GmbH ($N_2SA$: 175 $m^2/g$, average primary particle size: 18 nm)

Silica 3: Zeosil 1115MP manufactured by Solvay ($N_2SA$: 115 $m^2/g$, average primary particle size: 25 nm)

Silane coupling agent: 5i226 manufactured by Evonik Degussa GmbH (bis(3-triethoxysilylpropyl)disulfide)

Oil: VivaTec 400 manufactured by H&R Group (TDAE oil)

Resin component: Sylvatraxx 4401 manufactured by Kraton Corporation (α-methylstyrene resin, Mw: 700, softening point: 35° C.)

Wax: OZOACE 0355 manufactured by Nippon Seiro Co., Ltd.

Antioxidant: Antigen 6C manufactured by Sumitomo Chemical Co., Ltd. (N-(1,3-dimethylbutyl)-N'-phenyl-p-phenylenediamine)

Stearic acid: Bead stearic acid "CAMELLIA" manufactured by NOF CORPORATION

Zinc oxide: Zinc oxide No. 1 manufactured by Mitsui Mining & Smelting Co., Ltd.

Sulfur: Powdered sulfur manufactured by Karuizawa Sulfur Co, Ltd.

Vulcanization accelerator 1: Nocceler CZ manufactured by Ouchi Shinko Chemical Industry Co., Ltd. (N-cyclohexyl-2-benzothiazolylsulfenamide)

Vulcanization accelerator 2: Nocceler D manufactured by Ouchi Shinko Chemical Industry Co., Ltd. (N-,N'-diphenylguanidine)

Production Example 1: Synthesis of SBR2

Two autoclaves each having an inlet at a bottom part and an outlet at a head part and equipped with a stirrer and a jacket were coupled as reactors (inner volume of 10 L) to each other in series, where butadiene, styrene, and cyclohexane were mixed at a predetermined ratio under nitrogen atmosphere. After this mixed solution was made to pass through a dehydration column filled with active alumina and was mixed with n-butyllithium in a static mixer in order to remove impurities, the mixture was continuously supplied from the bottom part of the first reactor, and, further, each of 2,2-bis(2-oxiranyl) propane as a polar substance and n-butyllithium as a polymerization initiator was continuously supplied at predetermined rates from the bottom part of the first reactor, and the temperature inside the reactor was kept at 95° C. The polymer solution was continuously extracted from the head part of the reactor and supplied to the second reactor. The second reactor was kept at a temperature of 95° C., and a mixture of tetraglycidyl-1,3-bis(aminomethyl)cyclohexane (monomer) as a modifying agent and an oligomer component was continuously added at a predetermined rate as a 1000-fold diluted cyclohexane solution, to perform a modification reaction. This polymer solution was continuously extracted from the reactor, and 2,6-di-tert-butyl-p-cresol was continuously added in the static mixer. Next, after 25 parts by mass of extender oil (NC-140 manufactured by ENEOS) was added to 100 parts by mass of the polymer solution, the mixture was subjected to removal of solvent by steam stripping and dried by a heat roll whose temperature was adjusted to 110° C. to obtain a SBR2.

Examples and Comparative Examples

According to the compounding formulations shown in Table 1, using a 1.7 L closed Banbury mixer, chemicals other than sulfur and a vulcanization accelerator were kneaded for 1 to 10 minutes until the temperature reached a discharge temperature of 150° C. to 160° C., to obtain a kneaded product. Next, using a twin-screw open roll, sulfur and the vulcanization accelerator were added to the obtained kneaded product, and the mixture was kneaded for 4 minutes until the temperature reached 105° C., to obtain an unvulcanized rubber composition. The obtained unvulcanized rubber composition was extruded into shapes of a cap rubber later (thickness: 7.0 mm) and a base rubber layer (thickness: 1.8 mm) of a tread using an extruder equipped with a mouthpiece having a predetermined shape (the thickness of the entire tread is 8.8 mm) and attached together with other tire members to produce an unvulcanized tire. The unvulcanized tire was press-vulcanized at 170° C. for 12 minutes to produce each test tire listed in Table 1 (size: 205/65R15, rim: 15×6JJ, internal pressure: 230 KPa). Besides, circumferential grooves were formed to have a groove depth (the deepest part) of 4.6 mm.

<Brittleness temperature>

A vulcanized rubber was taken from a cap rubber layer of a tread of each test tire and cut out into a piece having a length of 20 mm, a width of 4 mm, and a thickness of 1 mm, and 50% brittleness temperature by impact of the piece was measured in accordance with JIS K6261-2:2017 "Rubber, vulcanized or thermoplastic-Determination of low-temperature properties–Part 2: Low-temperature brittleness".

<0° C. tan δ>

A vulcanized rubber was taken from a cap rubber layer of a tread of each test tire and cut out into a piece having a length of 20 mm, a width of 4 mm, and a thickness of 1 mm, and a loss tangent (tan δ) of the piece was measured using a viscoelastic spectrometer manufactured by Iwamoto Seisakusho Co., Ltd. under a condition of a temperature at 0° C., a frequency of 10 Hz, an initial strain of 10%, a dynamic strain of 2.5%, and an extension mode. The results show that the larger the 0° C. tan δ is, the more excellent the wet grip performance is.

<−30° C. Elongation at Break EB>

A vulcanized rubber was taken from a cap rubber layer of a tread of each test tire and cut out into a piece having a length of 20 mm, a width of 4 mm, and a thickness of 1 mm, and a tensile test was performed using a specimen of dumbbell-shaped No. 7 made of a vulcanized rubber sheet of each test tire in accordance with JIS K6251:2017 "Rubber, vulcanized or thermoplastic-Determination of tensile stress-strain properties" under a condition of a temperature at −30° C., to measure an elongation at break (EB). The results show that the higher the elongation at break EB at −30° C. is, the more excellent the chipping resistance at a low temperature is. A target value for performance was set to 340% or more.

<Wet Grip Performance Index>

Using the following equation, a wet grip performance index of each tire was indicated with a wet grip performance index of Example 1 being as 100. The results show that the larger the index is, the more excellent the wet grip performance is.

(Wet grip performance index)=(0° C. tan δ of each compounding example)/(0° C. tan δ of Example 1)×100

TABLE 1

| Compounding amount (part by mass) | Rubber layer compounding |||||||||| 
|---|---|---|---|---|---|---|---|---|---|---|
| | A1 | A2 | A3 | A4 | A5 | A6 | A7 | A8 | A9 | A10 |
| NR | 10 | 10 | 10 | 10 | 10 | 10 | 10 | 10 | 10 | 20 |
| SBR1 | 27 | 27 | 37 | 27 | 47 | 37 | 27 | 47 | 27 | 17 |
| SBR2 | 35 | 35 | 35 | 35 | 35 | 35 | 35 | 35 | 35 | 35 |
| (Oil content) | (7) | (7) | (7) | (7) | (7) | (7) | (7) | (7) | (7) | (7) |
| BR1 | 35 | 35 | 25 | 35 | 15 | 25 | 35 | 15 | 35 | 35 |
| BR2 | — | — | — | — | — | — | — | — | — | — |
| Carbon black 1 | 30 | 30 | 30 | 30 | 30 | 30 | 30 | 30 | 30 | 30 |
| Carbon black 2 | — | — | — | — | — | — | — | — | — | — |
| Silica 1 | — | 40 | 40 | — | 40 | 40 | — | 40 | — | — |

TABLE 1-continued

| | | | | | | | | | | |
|---|---|---|---|---|---|---|---|---|---|---|
| Silica 2 | 40 | — | — | 40 | — | — | 40 | — | 40 | 40 |
| Silica 3 | — | F | — | — | — | — | — | — | — | — |
| Silane coupling agent | 3.0 | 4.0 | 4.0 | 3.0 | 4.0 | 4.0 | 3.0 | 4.0 | 3.0 | 3.0 |
| Oil | 10 | 10 | 10 | 10 | 10 | 10 | 10 | 10 | 10 | 10 |
| Resin component | — | — | — | 5 | — | 5 | 10 | 5 | — | — |
| Wax | 1.5 | 1.5 | 1.5 | 1.5 | 1.5 | 1.5 | 1.5 | 1.5 | 1.5 | 1.5 |
| Antioxidant | 2.0 | 2.0 | 2.0 | 2.0 | 2.0 | 2.0 | 2.0 | 2.0 | 2.0 | 2.0 |
| Stearic acid | 2.0 | 2.0 | 2.0 | 2.0 | 2.0 | 2.0 | 2.0 | 2.0 | 2.0 | 2.0 |
| Zinc oxide | 2.0 | 2.0 | 2.0 | 2.0 | 2.0 | 2.0 | 2.0 | 2.0 | 2.0 | 2.0 |
| Sulfur | 1.5 | 1.5 | 1.5 | 1.5 | 1.5 | 1.5 | 1.5 | 1.5 | 1.5 | 1.5 |
| Vulcanization accelerator 1 | 2.5 | 2.5 | 2.5 | 2.5 | 2.5 | 2.5 | 2.5 | 2.5 | 2.5 | 2.5 |
| Vulcanization accelerator 2 | 1.0 | 1.0 | 1.0 | 1.0 | 1.0 | 1.0 | 1.0 | 1.0 | 1.0 | 1.0 |
| Physical properties | | | | | | | | | | |
| Brittleness temperature (° C.) | −58 | −58 | −56 | −52 | −54 | −50 | −46 | −48 | −58 | −58 |
| Elongation at break EB at −30° C. (%) | 340 | 350 | 370 | 370 | 390 | 400 | 400 | 420 | 340 | 340 |
| 0° C. tan δ | 0.38 | 0.39 | 0.42 | 0.43 | 0.46 | 0.48 | 0.48 | 0.52 | 0.38 | 0.37 |

| Compounding amount (part by mass) | Rubber layer compounding | | | | | | | |
|---|---|---|---|---|---|---|---|---|
| | A11 | A12 | A13 | A14 | A15 | A16 | A17 | B1 |
| NR | 10 | — | 25 | 10 | 10 | 20 | 20 | 70 |
| SBR1 | 47 | 65 | 47 | 27 | 27 | 17 | 17 | — |
| SBR2 | 35 | — | 35 | 35 | 35 | 35 | 35 | — |
| (Oil content) | (7) | — | (7) | (7) | (7) | (7) | (7) | — |
| BR1 | 15 | 35 | — | 35 | 35 | 35 | 35 | — |
| BR2 | — | — | — | — | — | — | — | 30 |
| Carbon black 1 | 30 | 30 | 30 | 70 | 30 | 30 | 30 | — |
| Carbon black 2 | — | — | — | — | — | — | — | 40 |
| Silica 1 | 40 | — | — | — | — | — | — | — |
| Silica 2 | — | 40 | 40 | — | — | 40 | 40 | — |
| Silica 3 | — | — | — | — | 40 | — | — | — |
| Silane coupling agent | 4.0 | 3.0 | 3.0 | — | 3.0 | 3.0 | 3.0 | — |
| Oil | 10 | 10 | 10 | 10 | 10 | 10 | 10 | 7.0 |
| Resin component | 10 | 5 | 5 | 5 | 5 | 20 | 5 | — |
| Wax | 1.5 | 1.5 | 1.5 | 1.5 | 1.5 | 1.5 | 1.5 | 2.0 |
| Antioxidant | 2.0 | 2.0 | 2.0 | 2.0 | 2.0 | 2.0 | 2.0 | 2.0 |
| Stearic acid | 2.0 | 2.0 | 2.0 | 2.0 | 2.0 | 2.0 | 2.0 | 2.0 |
| Zinc oxide | 2.0 | 2.0 | 2.0 | 2.0 | 2.0 | 2.0 | 2.0 | 2.0 |
| Sulfur | 1.5 | 1.5 | 1.5 | 1.5 | 1.5 | 1.5 | 1.5 | 2.0 |
| Vulcanization accelerator 1 | 2.5 | 2.5 | 2.5 | 2.5 | 2.5 | 2.5 | 2.5 | 2.0 |
| Vulcanization accelerator 2 | 1.0 | 1.0 | 1.0 | 1.0 | 1.0 | 1.0 | 1.0 | — |
| Physical properties | | | | | | | | |
| Brittleness temperature (° C.) | −42 | −65 | −50 | −54 | −52 | −39 | −52 | −70 |
| Elongation at break EB at −30° C. (%) | 390 | 390 | 330 | 270 | 310 | 300 | 330 | — |
| 0° C. tan δ | 0.57 | 0.32 | 0.60 | 0.49 | 0.43 | 0.45 | 0.40 | — |

TABLE 2

| | Example | | | | | | | |
|---|---|---|---|---|---|---|---|---|
| | 1 | 2 | 3 | 4 | 5 | 6 | 7 | 8 |
| Cap rubber layer compounding | A1 | A2 | A3 | A4 | A5 | A6 | A7 | A8 |
| Base rubber layer compounding | B1 | B1 | B1 | B1 | B1 | B1 | B1 | B1 |

TABLE 2-continued

| | | | | | | | | |
|---|---|---|---|---|---|---|---|---|
| Brittleness temperature A (° C.) of cap rubber layer | −58 | −58 | −56 | −52 | −54 | −50 | −46 | −48 |
| 0° C. tan δ of cap rubber layer | 0.38 | 0.39 | 0.42 | 0.43 | 0.46 | 0.48 | 0.48 | 0.52 |
| Tire | | | | | | | | |
| Thickness of the entire tread (mm) | 8.8 | 8.8 | 8.8 | 8.8 | 8.8 | 8.8 | 8.8 | 8.8 |
| H (mm) | 7.0 | 7.0 | 7.0 | 7.0 | 7.0 | 7.0 | 7.0 | 7.0 |
| B (= H/thickness of the entire tread) | 0.80 | 0.80 | 0.80 | 0.80 | 0.80 | 0.80 | 0.80 | 0.80 |
| A/B | −72.5 | −72.5 | −70.0 | −65.0 | −67.5 | −62.5 | −57.5 | −60.0 |
| Evaluation | | | | | | | | |
| Elongation at break EB (%) at −30° C. of cap rubber layer | 340 | 350 | 370 | 370 | 390 | 400 | 400 | 420 |
| Wet grip performance index | 100 | 103 | 111 | 113 | 121 | 126 | 126 | 137 |

| | Example | | | Comparative example | | | | |
|---|---|---|---|---|---|---|---|---|
| | 9 | 11 | 12 | 1 | 2 | 3 | 4 | 5 |
| Cap rubber layer compounding | A9 | A11 | A13 | A12 | A14 | A15 | A16 | A17 |
| Base rubber layer compounding | B1 | B1 | B1 | B1 | B1 | B1 | B1 | B1 |
| Brittleness temperature A (° C.) of cap rubber layer | −58 | −50 | −50 | −65 | −54 | −52 | −39 | −52 |
| 0° C. tan δ of cap rubber layer | 0.38 | 0.60 | 0.60 | 0.32 | 0.49 | 0.43 | 0.45 | 0.40 |
| Tire | | | | | | | | |
| Thickness of the entire tread (mm) | 8.8 | 8.8 | 8.8 | 8.8 | 8.8 | 8.8 | 8.8 | 8.8 |
| H (mm) | 7.9 | 7.0 | 7.0 | 7.0 | 7.0 | 7.0 | 7.0 | 6.2 |
| B (= H/thickness of the entire tread) | 0.90 | 0.80 | 0.80 | 0.80 | 0.80 | 0.80 | 0.80 | 0.70 |
| A/B | −64.4 | −62.5 | −62.5 | −81.3 | −67.5 | −65.0 | −48.8 | −74.3 |
| Evaluation | | | | | | | | |
| Elongation at break EB (%) at −30° C. of cap rubber layer | 340 | 390 | 390 | 330 | 270 | 310 | 300 | 330 |
| Wet grip performance index | 100 | 150 | 158 | 84 | 129 | 113 | 98 | 95 |

From the results shown in Table 2, it can be found that the rubber composition for tire tread of the present disclosure has an excellent balance of chipping resistance at a low temperature and wet grip performance.

[1] A tire comprising a tread,
wherein the tread has land parts partitioned by a plurality of circumferential grooves,
wherein at least one of the land parts has a lateral groove neither of both ends of which opens into the circumferential grooves,
wherein the tread has at least one rubber layer,
wherein, among the at least one rubber layer, a rubber layer of a tread surface is composed of a rubber composition comprising a rubber component, a filler, and a silane coupling agent,
wherein the rubber component of the rubber layer of the tread surface comprises an isoprene-based rubber and a styrene-butadiene rubber,
wherein the filler comprises silica whose average primary particle size is 18 nm or less,
wherein, when a brittleness temperature of the rubber composition is defined as A (° C.) and a ratio of a groove depth at the deepest part of the groove bottom of the lateral groove neither of both ends of which opens into the circumferential grooves to a thickness of the entire tread is defined as B, A is −40 or less (preferably −42 or less, more preferably −45 or less), B is 0.80 or more (preferably 0.82 or more, more preferably 0.85 or more), and A/B is −75 to −50 (preferably −73 to −56, more preferably −70 to −58).

[2] The tire of [1] above, wherein the rubber composition comprises a resin component.

[3] The tire of [1] or [2] above, wherein a content of the silica in the filler is 30 to 95% by mass (preferably 40 to 85%, more preferably 45 to 75%).

[4] The tire of any one of [1] to [3] above, wherein the rubber composition comprises 2.8 parts by mass or more (preferably 3.0 parts by mass or more) of a silane coupling agent based on 100 parts by mass of the rubber component.

[5] The tire of any one of [1] to [4] above, wherein the rubber component comprises 7 to 40% by mass (preferably 10 to 25%) of an isoprene-based rubber, 25 to 60% by mass of a styrene-butadiene rubber, and 10 to 40% by mass (preferably 15 to 35%) of a butadiene rubber.

[6] The tire of any one of [1] to [5] above, wherein an elongation at break of the rubber composition under an atmosphere at −30° C. in accordance with JIS K 6251:2017 is 340% or more (preferably 350% or more, more preferably 370% or more).

[7] The tire of any one of [1] to [6] above, wherein a tan δ of the rubber composition at 0° C. is 0.35 or more (preferably 0.38 or more, more preferably 0.40 or more).

REFERENCE SIGNS LIST

1 Tread surface
2 Center land part
3 Shoulder land part
4 Circumferential groove
Lateral groove
6 Lateral groove
7 Lateral groove
8 Shoulder sipe
9 Center sipe
C Tire circumferential direction
CL Tire equatorial plane
W Tire width direction
Te Tread edge

What is claimed is:

1. A tire comprising a tread,
wherein the tread has land parts partitioned by a plurality of circumferential grooves,
wherein at least one of the land parts has a closed lateral groove that extends axially within the land part such that both axial ends terminate within the land part and do not open into any of the circumferential grooves,
wherein a groove depth H at the deepest part of the groove bottom of the closed lateral groove is larger than and is at least 1.5 times a groove depth of the circumferential grooves,
wherein the tread has at least one rubber layer,
wherein, among the at least one rubber layer, a cap rubber layer of a tread surface is composed of a rubber composition comprising a rubber component, a filler, and a silane coupling agent,
wherein the rubber component of the cap rubber layer of the tread surface comprises isoprene-based rubber, styrene-butadiene rubber and butadiene rubber,
wherein the rubber component of the rubber composition of the cap rubber layer comprises 7 to 25% by mass of isoprene-based rubber and 40 to 80% by mass of styrene-butadiene rubber, both based on 100% by mass of the rubber component,
wherein a total content of filler based on 100 parts by mass of the rubber component in the rubber composition of the cap rubber layer is 40 to 100 parts by mass,
wherein a content of silica in the filler based on 100 parts by mass of the rubber component in the rubber composition of the cap rubber layer is 25 to 95 parts by mass or less,
wherein a content of the silica in the filler in the rubber composition of the cap rubber layer is 30 to 95% by mass of the filler,
wherein an elongation at break of the rubber composition of the cap rubber layer under an atmosphere at −30° C. in accordance with JIS K 6251:2017 is 340% or more,
wherein a tan δ of the rubber composition of the cap rubber layer at 0° C. is 0.35 or more,
wherein the silica has an average primary particle size that is 18 nm or less,
wherein, when a brittleness temperature of the rubber composition of the cap rubber layer is defined as A (° C.) and a ratio of a groove depth at the deepest part of the groove bottom of the closed lateral groove to a thickness of the entire tread is defined as B, A is −46 or less, B is 0.80 or more, and A/B is −75 to −50.

2. The tire of claim 1, wherein the rubber composition of the cap rubber layer comprises a resin component.

3. The tire of claim 1, wherein content of the silica in the filler in the rubber composition of the cap rubber layer is 50 to 95% by mass of filler.

4. The tire of claim 1, wherein the rubber composition of the cap rubber layer comprises 2.8 parts by mass or more of a silane coupling agent based on 100 parts by mass of the rubber component.

5. The tire of claim 1, wherein the rubber component of the rubber composition of the cap rubber layer comprises 7 to 25% by mass of isoprene-based rubber, 40 to 60% by mass of styrene-butadiene rubber, and 10 to 40% by mass of butadiene rubber.

6. The tire of claim 1, wherein the closed lateral groove is provided in a shoulder land part.

7. The tire of claim 1, wherein a content of the silica in the filler in the rubber composition of the cap rubber layer is 30 to 85% by mass of filler.

8. The tire of claim 1, wherein A is −50 or less.

9. The tire of claim 1, wherein a thickness of the cap rubber layer is 3.5 mm or more.

10. The tire of claim 1, wherein the tread comprises a base rubber layer positioned adjacent to outer side of a belt layer in a tire radial direction, and a thickness of the base rubber layer is 1.5 mm or more.

11. The tire of claim 1, wherein a thickness of the entire tread is 8.5 mm or more.

12. The tire of claim 1, wherein the tire is a large SUV tire.

* * * * *